(12) United States Patent
Bauer et al.

(10) Patent No.: US 8,088,355 B2
(45) Date of Patent: Jan. 3, 2012

(54) TRANSITIONAL ALUMINA PARTICULATE MATERIALS HAVING CONTROLLED MORPHOLOGY AND PROCESSING FOR FORMING SAME

(75) Inventors: Ralph Bauer, Niagara Falls (CA); Doruk O. Yener, Grafton, MA (US); Margaret L. Skowron, Niagara Falls, NY (US); Martin Barnes, Ransomville, NY (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 809 days.

(21) Appl. No.: 11/754,889

(22) Filed: May 29, 2007

(65) Prior Publication Data

US 2008/0003131 A1 Jan. 3, 2008

(51) Int. Cl.
C01F 7/02 (2006.01)
(52) U.S. Cl. ........................... 423/626; 423/625
(58) Field of Classification Search .................. 423/625, 423/626
See application file for complete search history.

(56) References Cited

U.S. PATENT DOCUMENTS

| | | | |
|---|---|---|---|
| 2,763,620 A | 9/1956 | Bugosh | |
| 2,915,475 A | 12/1959 | Bugosh | |
| 3,056,747 A | 10/1962 | Arthur, Jr. | |
| 3,108,888 A | 10/1963 | Bugosh | |
| 3,117,944 A | 1/1964 | Harrell | |
| 3,136,644 A | 6/1964 | Pangonis | |
| 3,202,626 A | 8/1965 | FitzSimmons | |
| 3,321,272 A | 5/1967 | Kerr | |
| 3,357,791 A | 12/1967 | Napier | |
| 3,385,663 A | 5/1968 | Hughes | |
| 3,387,447 A | 6/1968 | Trammell et al. | |
| 3,790,495 A | 2/1974 | Podschus | |
| 3,814,782 A | 6/1974 | Hayes et al. | |
| 3,842,111 A | 10/1974 | Meyer-Simon et al. | |
| 3,853,688 A | 12/1974 | D'Ambrosio | |
| 3,865,917 A | 2/1975 | Galasso et al. | |
| 3,873,489 A | 3/1975 | Thurn et al. | |
| 3,950,180 A | 4/1976 | Kato | |
| 3,978,103 A | 8/1976 | Meyer-Simon et al. | |
| 3,997,581 A | 12/1976 | Pletka et al. | |
| 4,002,594 A | 1/1977 | Fetterman | |
| 4,105,465 A | 8/1978 | Berger | |
| 4,117,105 A | 9/1978 | Hertzenberg et al. | |
| 4,120,943 A | 10/1978 | Iwaisako et al. | |
| 4,344,928 A | 8/1982 | Dupin et al. | |
| 4,377,418 A | 3/1983 | Birchall et al. | |
| 4,386,185 A | 5/1983 | Macdonell et al. | |
| 4,492,682 A | 1/1985 | Trebillon | |
| 4,525,494 A | 6/1985 | Andy | |
| 4,539,365 A | 9/1985 | Rhee | |
| 4,558,102 A | 12/1985 | Miyata | |
| 4,623,738 A | 11/1986 | Sugerman et al. | |
| 4,632,364 A | 12/1986 | Smith | |
| 4,716,029 A | 12/1987 | Oguri et al. | |
| 4,769,179 A | 9/1988 | Kato et al. | |
| 4,797,139 A * | 1/1989 | Bauer | 51/293 |
| 4,835,124 A * | 5/1989 | Pearson | 501/127 |
| 4,891,127 A | 1/1990 | Murrell et al. | |
| 4,946,666 A | 8/1990 | Brown | |
| 4,992,199 A | 2/1991 | Meyer et al. | |
| 5,155,085 A | 10/1992 | Hamano et al. | |
| 5,194,243 A | 3/1993 | Pearson et al. | |
| 5,286,290 A | 2/1994 | Risley | |
| 5,302,368 A | 4/1994 | Harato et al. | |
| 5,306,680 A | 4/1994 | Fukuda | |
| 5,318,628 A | 6/1994 | Matijevic et al. | |
| 5,321,055 A | 6/1994 | Slocum | |
| 5,332,777 A | 7/1994 | Goetz et al. | |
| 5,344,489 A | 9/1994 | Matijevic et al. | |
| 5,401,703 A | 3/1995 | Fukuda | |
| 5,413,985 A | 5/1995 | Thome et al. | |
| 5,445,807 A | 8/1995 | Pearson | |
| 5,508,016 A | 4/1996 | Yamanishi et al. | |
| 5,527,851 A | 6/1996 | Barron et al. | |
| 5,550,180 A | 8/1996 | Elsik et al. | |
| 5,580,914 A | 12/1996 | Falla et al. | |
| 5,580,919 A | 12/1996 | Agostini et al. | |
| 5,583,245 A | 12/1996 | Parker et al. | |
| 5,663,396 A | 9/1997 | Musleve et al. | |
| 5,684,171 A | 11/1997 | Wideman et al. | |
| 5,684,172 A | 11/1997 | Wideman et al. | |
| 5,696,197 A | 12/1997 | Smith et al. | |
| 5,707,716 A | 1/1998 | Yoshino et al. | |
| 5,723,529 A | 3/1998 | Bernard et al. | |
| 5,785,722 A | 7/1998 | Garg et al. | |
| 5,849,827 A | 12/1998 | Bodiger et al. | |
| 5,900,449 A | 5/1999 | Custodero et al. | |
| 5,955,142 A | 9/1999 | Yoshino et al. | |
| 5,962,124 A | 10/1999 | Yoshino et al. | |
| 5,989,515 A | 11/1999 | Watanabe et al. | |
| 6,017,632 A | 1/2000 | Pinnavaia et al. | |
| 6,143,816 A | 11/2000 | Prescher et al. | |
| 6,156,835 A | 12/2000 | Anderson et al. | |
| 6,203,695 B1 | 3/2001 | Harle et al. | |
| 6,280,839 B1 | 8/2001 | Brown et al. | |
| 6,403,007 B1 | 6/2002 | Kido et al. | |
| 6,413,308 B1 | 7/2002 | Xu et al. | |
| 6,417,286 B1 | 7/2002 | Agostini et al. | |
| 6,440,187 B1 | 8/2002 | Kasai et al. | |

(Continued)

FOREIGN PATENT DOCUMENTS

CN  1237146 A  12/1999

(Continued)

OTHER PUBLICATIONS

Zhang, L. et al., "Preparation and Characterization of Nano-fibrous g-Al2O3," Shiyou Huagong, vol. 33, No. 3, pp. 240-243, 2004. Abstract Only.

(Continued)

Primary Examiner — Edward Johnson
(74) Attorney, Agent, or Firm — Abel Law Group, LLP (57) ABSTRACT

An alumina particulate material is disclosed, including particles comprising transitional alumina having an aspect ratio of not less than 3:1 and an average particle size of not less than about 75 nm. Also disclosed are fabrication techniques based on seeded processing pathways.

17 Claims, 3 Drawing Sheets

U.S. PATENT DOCUMENTS

| | | |
|---|---|---|
| 6,440,552 B1 | 8/2002 | Kajihara et al. |
| 6,485,656 B1 | 11/2002 | Meyer et al. |
| 6,486,254 B1 | 11/2002 | Barbee et al. |
| 6,506,358 B1 | 1/2003 | Stamires et al. |
| 6,534,584 B2 | 3/2003 | Wideman et al. |
| 6,576,324 B2 | 6/2003 | Yoshino et al. |
| 6,610,261 B1 | 8/2003 | Custodero et al. |
| 6,635,700 B2 | 10/2003 | Cruse et al. |
| 6,646,026 B2 | 11/2003 | Fan et al. |
| 6,648,959 B1 | 11/2003 | Fischer et al. |
| 6,653,387 B2 | 11/2003 | Causa et al. |
| 6,689,432 B2 | 2/2004 | Kitamura et al. |
| 6,706,660 B2 | 3/2004 | Park |
| 6,747,087 B2 | 6/2004 | Custodero et al. |
| 6,841,207 B2 | 1/2005 | Burch et al. |
| 6,858,665 B2 | 2/2005 | Larson |
| 6,872,444 B2 | 3/2005 | McDonald et al. |
| 6,924,011 B2 | 8/2005 | Van Aert et al. |
| 7,056,585 B2 | 6/2006 | Mishima et al. |
| 7,189,775 B2 | 3/2007 | Tang et al. |
| 7,211,612 B2 | 5/2007 | Kikuchi |
| 7,226,647 B2 | 6/2007 | Kasperchik et al. |
| 7,479,324 B2 | 1/2009 | Bianchi et al. |
| 7,531,161 B2 | 5/2009 | Tang et al. |
| 2002/0004549 A1 | 1/2002 | Custodero et al. |
| 2002/0169243 A1 | 11/2002 | Nippa |
| 2003/0095905 A1 | 5/2003 | Scharfe et al. |
| 2003/0185736 A1 | 10/2003 | Hatanaka et al. |
| 2003/0185739 A1 | 10/2003 | Mangold et al. |
| 2003/0197300 A1 | 10/2003 | Tang et al. |
| 2003/0202923 A1 | 10/2003 | Custodero et al. |
| 2004/0030017 A1 | 2/2004 | Simonot et al. |
| 2004/0120904 A1 | 6/2004 | Lye et al. |
| 2004/0166324 A1 | 8/2004 | Mishima et al. |
| 2004/0265219 A1 | 12/2004 | Bauer et al. |
| 2005/0124745 A1 | 6/2005 | Bauer et al. |
| 2005/0227000 A1 | 10/2005 | Bauer et al. |
| 2005/0267238 A1 | 12/2005 | Mutin |
| 2006/0096891 A1 | 5/2006 | Stamires et al. |
| 2006/0104895 A1 | 5/2006 | Bauer et al. |
| 2006/0106129 A1 | 5/2006 | Gernon et al. |
| 2006/0148955 A1 | 7/2006 | Guiselin et al. |
| 2007/0104952 A1 | 5/2007 | Bianchi et al. |
| 2008/0313808 A1 | 12/2008 | Crue |

FOREIGN PATENT DOCUMENTS

| | | |
|---|---|---|
| CN | 1266020 A | 9/2000 |
| CO | 07-042447 | 11/2006 |
| CS | 195426 | 5/1982 |
| DE | 956535 | 1/1957 |
| DE | 2163678 | 7/1973 |
| DE | 2408122 | 8/1974 |
| DE | 2952666 | 7/1980 |
| DE | 199 31 204 | 1/2001 |
| EP | 0 038 620 A2 | 10/1981 |
| EP | 0 015 196 | 4/1982 |
| EP | 0 108 968 A1 | 5/1984 |
| EP | 0 304 721 A1 | 3/1988 |
| EP | 0 563 653 A1 | 10/1993 |
| EP | 0 667 405 A1 | 8/1995 |
| EP | 0 501 227 B1 | 12/1995 |
| EP | 0 735 001 A2 | 10/1996 |
| EP | 0 885 844 A1 | 12/1998 |
| EP | 0 896 021 A1 | 2/1999 |
| EP | 1 225 200 A2 | 7/2002 |
| EP | 1 256 599 A1 | 11/2002 |
| EP | 1 323 775 A1 | 7/2003 |
| EP | 0 697 432 B1 | 10/2003 |
| EP | 1 000 965 B1 | 10/2003 |
| EP | 0 807 603 B1 | 12/2003 |
| EP | 1 112 961 B1 | 9/2004 |
| EP | 0736392 A1 | 10/2006 |
| FR | 2927267 A1 | 8/2009 |
| GB | 1022944 | 3/1966 |
| GB | 1189304 | 4/1970 |
| GB | 2248841 | 4/1992 |
| HU | 26758 T | 9/1983 |
| JP | 45-032530 | 10/1970 |
| JP | 55-116622 A | 9/1980 |
| JP | 56-009427 A | 1/1981 |
| JP | 58-026029 A2 | 2/1983 |
| JP | 58-185434 A | 10/1983 |
| JP | 59-193949 | 11/1984 |
| JP | 60-046923 | 3/1985 |
| JP | 61-179264 A | 8/1986 |
| JP | H4-78586 A | 9/1986 |
| JP | 62-030133 A | 2/1987 |
| JP | 63-147820 A2 | 6/1988 |
| JP | 63-147821 A2 | 6/1988 |
| JP | S63-131321 A | 6/1988 |
| JP | 05-279019 | 10/1993 |
| JP | 63-22243 | 11/1994 |
| JP | 7-18174 | 1/1995 |
| JP | 9-99627 A | 4/1997 |
| JP | 09-208809 | 8/1997 |
| JP | 9-511258 | 11/1997 |
| JP | 2686833 B2 | 12/1997 |
| JP | 2000-86235 A | 3/2000 |
| JP | 2000-239014 | 9/2000 |
| JP | 2001-058818 A | 3/2001 |
| JP | 2001-139326 A | 5/2001 |
| JP | 2001-180930 | 7/2001 |
| JP | 2001/207077 | 7/2001 |
| JP | 2001-240633 A | 9/2001 |
| JP | 2001-261976 | 9/2001 |
| JP | 2001-303458 A | 10/2001 |
| JP | 2001-323188 A | 11/2001 |
| JP | 2003-002642 | 1/2003 |
| JP | 2003-054941 | 2/2003 |
| JP | 2003-107206 | 4/2003 |
| JP | 2003-238150 | 8/2003 |
| JP | 2003238826 A | 8/2003 |
| JP | 2003-313027 A | 11/2003 |
| JP | 2004-001463 A | 1/2004 |
| JP | 2004-051390 A2 | 2/2004 |
| JP | 2004-59643 A | 2/2004 |
| JP | 2004-122784 A | 4/2004 |
| KR | 10-1999-0051408 | 1/2002 |
| RU | 2148567 C1 | 5/2000 |
| SU | 267064 A | 7/1970 |
| SU | 1444080 | 12/1988 |
| WO | WO 95/11270 | 4/1995 |
| WO | WO 97/23566 | 7/1997 |
| WO | WO 98/14426 | 4/1998 |
| WO | 99/35089 A1 | 7/1999 |
| WO | 0188265 A2 | 11/2001 |
| WO | 03/11941 A2 | 2/2003 |
| WO | 03/11941 A3 | 2/2003 |
| WO | WO 03/089508 A1 | 10/2003 |
| WO | WO 2004/016630 A1 | 2/2004 |
| WO | WO 2004/056915 A1 | 7/2004 |
| WO | WO 2004/090023 A1 | 10/2004 |
| WO | WO 2005/100244 A2 | 10/2005 |
| WO | WO 2005/100491 A2 | 10/2005 |
| WO | WO 2006/002993 A1 | 1/2006 |
| WO | 2006/049863 A1 | 5/2006 |
| WO | WO 2006/049863 A1 | 5/2006 |
| WO | WO 2006/60206 A1 | 6/2006 |
| WO | WO 2006/60468 A3 | 6/2006 |
| WO | WO 2007/056404 A1 | 5/2007 |
| WO | 2009109722 A1 | 9/2009 |

OTHER PUBLICATIONS

Zhu, H. et al., "Novel Synthesis of Alumina Oxide Nanofibers," Materials Research Society Symposium Proceedings, vol. 703, pp. 25-30, 2002. Abstract Only.

Zhu, H., et al., "g-Alumina Nanofibers Prepared From Aluminum Hydrate with Poly(ethylene oxide) Surfactant," Chemistry of Materials, vol. 14, No. 5, pp. 2086-2093, 2002. Abstract Only.

Wakayama, H., et al., "Nanoporous Metal Oxides Xynthesized by the Nanoscale Casting Process Using Supercritical Fluids," Chemistry of Materials, vol. 13, No. 7, pp. 2392-2396, 2001. Abstract Only.

Yu, Z. et al., "Preparation of Nanometer-sized Alumina Whiskers," Journal of Materails Research, vol. 13, No. 11, pp. 3017-3018, 1998. Abstract Only.

Kimura, Y., et al., "Synthesis of poly[(acyloxy)aloxane] with carboxyl ligand and its utilization for hte processing of alumina fiber," vol. 20, No. 10, pp. 2329-2334, 1987. Abstract Only.

Podergin, V., et al., "Electron-microscopic study of whiskers formed during pentoxide reduction by alunium," Metalloterm, Protsessy Khim. Met., pp. 44-50, 1972. Abstract Only.

Park, B., et al., "Preparation of High-Capacity Ceramic Catalytic Support from Gibbsite," Han'Guk Seramik Hakhoechi, vol. 39, No. 3, pp. 245-251, 2002. Abstract Only.

Brusasco R., et al., "Preparation and Characterization of Fibrillar Boehmite and g-Aluminum Oxide," Materials Research Bulletin, vol. 19, No. 11, pp. 1489-1496, 1984. Abstract Only.

Kuang, X., et al., "Preparation of Special-shaped g-AlOOH g-Al2O3 Ultrafine Powders by Hydrothermal Reaction Method," Materials and Components for Engines, pp. 594-597, 1994, Abstract Only.

Liu, S., et al., "Synthesis of Novel Nanostructured g-Al2O3 by Pyrolysis of Aluminumoxyhdride-HAlO," Journal of Materials Chemistry, vol. 13, No. 12, pp. 3107-3111, 2003. Abstract Only.

Hicks, R., et al., "Nanoparticle Assembly of Mesoporous AlOOH (Boehmite)," Chemistry of Materials, vol. 15, No. 1, pp. 78-82, 2003. Abstract Only.

Ozuna, O., et al., "Pressure Influenced Combustion Synthesis of Gamma- and Alpha-Al2O3 Nanocrystalline," Journal of Physics-Condensed Matter, vol. 16, No. 15, pp. 2585-2591, 2004. Abstract Only.

McHale, J. et al., "Effects of Increased Surface Area and Chemisorbed H2O on hte Relative Stability of Nanocrystalline Gamma-Al2O3 and Al2O3," Journal of Physical Chemistry, vol. 101, No. 4, pp. 603-613, 1997. Abstract Only.

Kuang, D., et al., "Fabrication of Boehmite AlOOH and Gamma-Al2O3 Nanotubes via a Soft Solution Route," Journal of Materials Chemistry, vol. 13, No. 4, pp. 660-662, 2003. Abstract Only.

Tijburg, I., et al., "Sintering of Pseudo-Boehmite and Gamma-Al2O3," Journal of Materials Science, vol. 26, No. 21, pp. 5945-5949, 1991. Abstract Only.

Wei, Z. et al., "Research for Separation of Precursor in the Preparation Process of Gamma-Al2O3 Ultrafine Powder via Precipitation," Journal of Basic Science and Engineering, vol. 12, pp. 19-23, 2004. Abstract Only.

Singhal, A., "Aluminum Speciation in Aqueous Solutions and Its Effect on Properties of Chemically Synthesized Alumina Powders (Ceramics)," Dissertation Abstracts International, vol. 55, No. 04-B, 1994. Abstract Only.

Kim, S., et al., "Preparation of High-Temperature Catalytic Support from Gabbsite II. Properties of Amorphous Alumina as Precursor of Catalyst Support," Journal of the Korean Ceramic Society, vol. 33, No. 1, pp. 92-100, 1996. Abstract Only.

Zhang, Z., et al., "Mesostructured Forms of Gamma-A(sub2)O(sub 3)," J. Am. Chemc. Soc., Vo. 124, No. 8, p. 15, ISSN/ISBN: 00027863. Abstract Only.

Llusar, M. et al., "Templated growth of Alumina-based Fibers Through the Use of Anthracenic Organogelators," Chemistry of Materials, vol. 14, No. 12, pp. 5124-5133, 2002. Abstract Only.

Strek, W., et al., "Preparation and Emission Spectra of Eu(III) in Nanostrcutred Gamma-Alumina," Spectrochimica Acta, Part A, vol. 54A, No. 13, pp. 2121-2124, 1997. Abstract Only.

Yogo, T., et al., "Synthesis of Polycrystalline Alumina Fibre with Aluminium Chelate Precursor," Journal of Materials Science, vol. 26, No. 19, pp. 5292-5296, 1999. Abstract Only.

Saraswati, V., et al., "X-ray Diffraction in Gamma-alumina Whiskers," Journal of Crystal Growth, vol. 83, No. 4, pp. 606-609, 1987. Abstract Only.

Zhu, H., et al., "Growth of Boehmite Nanoribers by Assembling Nanoparticles with Surfactant Micelles," Journal of Physical Chemistry, vol. 108, No. 14, pp. 4245-4247, 2006. Abstract Only.

Kamiya, K. et al., "Crystallization Behavior of Sol-Gel-Derived Alumina Fibers. Formation of .Alpha.-alumina Around 500.DEG.C.," Jinko Kessho Toronkai Koen Yoshishu, vol. 41, pp. 9-10, 1996. Abstract Only.

Lucuta, P., et al., "Phase Evolution in Al2O3 Fibre Prepared From an Oxychloride Precursor," Journal of Materials Science, vol. 27, No. 22, pp. 6053-6061, 1992. Abstract Only.

Thomas J. Martin, Sasol Presentation given on—Functionalized Aluminas, NABALTECH, web page: http://www.nabaltec.de/seiten_d/boehmit_d/anwendungen/news_05_08_98.htm.

Zhu, H. Y., et al., "Growth of Boehmite Nanofibers by Assembling Nanoparticles with Surfactant Micelles", J. Phys. Chem. B., vol. 108, pp. 4245-4247, 2004.

Fisch, H., et al., "Hybrid Materials Based on Polymer Matrices & Organic Components", NTIS, Germany 1994.

Buining et al., J. Am. Ceram. Soc. vol. 74 [6], pp. 1303-1307.

Anonymous: "High Purity Dispersible Aluminas"; URL:http://www.sasol.com/sasol_internet/downloads/DISPERAL-DISPAL_1055338543391.pdf>abstract; tables 1,2.

Boccaccini A. R. et al; "Alumina Ceramics Based on Seeded Boehmite and Electrophoretic Deposition"; Ceramics International; Elsevier; Amsterdam, NL; vol. 28, No. 8; 2002; pp. 893-897.

Grant et al., "Grant and Hackh's Chemical Dictionary", 5th Ed., (1987), McGraw-Hill Book. Co. USA, ISBN 0-07-024067-1, p. 160.

Cuneyt Tas, A., "Chemical Preparation of the Binary Compounds in the Calcia-Alumina Systems by Self-Propagating Combustion Synthesis," J. Am. Ceram. Soc., vol. 81, No. 11, pp. 2853-2863, 1998.

Tsai, D., et al., "Controlled Gelation and Sintering of Monolithic Gels Prepared from gamma-Alumina Fume Powder," J. Am. Ceram. Soc., vol. 74, No. 4, pp. 830-836, 1991.

Alexander, K. et al., "Grain Growth Kinetics in Alumina-Zirconia (CeZTA) Composites," J. Am. Ceram. Soc., vol. 77, No. 4, pp. 939-946, 1994.

Okada, K. et al., "Effect of Divalent Cation Additives on the gamma-Al2O3-to-Al2O3 Phase Transition," J. Am. Ceram. Soc., vol. 83, No. 4, pp. 928-932, 2000.

Brusasco, Raymond, M. "Preparation and Characterization of Acicular Particles and Thin Films of Aluminum Oxide," Thesis Brown University, May 1987, 107 pgs.

L.A. Blank et al., "Modification of fillers for Ftorlon-4 with microfibrous boehmite", Sov. Plast., 1972, 2, 66-67.

Paul A. Buining et al., "Preparation on (non-)aqueous dispersions of colloidal boehmite needles", Chemical Engineering Science, 48(2), 411-417, 1993.

Johann Buitenhuis et al., "Phase separation of mixtures of colloidal boehmite rods and flexible polymer," Journal of Colloid and Interface Science, 1995, 175, 46-56.

V.G. Fitzsimmons, W.A. Zisman, "Microfiber reinforcement of polytetrafluoroethylene", Modern Plastics, 1963, 40 (5), 151-154, 158, 160-162, 238-241.

John Bugosh et al., "A Novel fine alumina powder, fibrillar boehmite", I&EC Product Research and Development, vol. 1, No. 3, Sep. 1962.

P.A. Buining et al., "Preparation and properties of dispersions of colloidal boehmite rods", Progr Colloid Polym Sci 93:10-11 (1993).

Sridhar Komarneni, "Nanocomposites", J. Mater. Chem., 1992, 2(12), 1219-1230.

S. Furuta et al., "Preparation and properties of fibrous boehmite sol and its application for thin porous membrane", Journal of Materials Science Letters 13 (1994) 1077-1080.

B.S. Gevert and Zhong-Shu Ying, "Formation of fibrillar boehmite", Journal of Porous Materials, 6, 63-67 (1999).

M.P.B. Van Bruggen, "Preparation and properties of colloidal core-shell rods with adjustable aspect ratios", Langmuir 1998, 14, 2245-2255.

John Bugosh, "Colloidal alumina—the chemistry and morphology of colloidal boehmite", J. Phys. Chem., 1961, 65 (10), pp. 1789-1793.

Paul A. Buining et al., "Effect of hydrothermal conditions on the morphology of colloidal boehmite particles: Implications for fibril formation and monodispersity", J. Am. Ceram. Soc., 1990, 73[8] 2385-90.

Yueng et al, Mesoporous alumina membranes: Synthesis, characterizations, thermal stability and nonuniform distribution of catalyst, 1997, Journal of Membrane Science, 131, pp. 9-28.

Accuratus, Zirconium Oxide, Feb. 24, 2006, http://replay.waybackmachine.org/20060224140049/www.accuratus.com/zirc.html.

N. G. Papayannakos et al., "Effect of seeding during precursor preparation on the pore structure of alumina catalyst supports," Microporous Materials, Oct. 19, 1993, vol. 1, No. 6, pp. 413-422.

C. Skoufadis et al., "Kinetics of boehmite precipitation from supersturated sodium aluminate solutions," Hydrometallurgy, Feb. 2003, vol. 68, No. 1-3, pp. 57-68.

D. Panias, "Role of boehmite/solution interface in boehmite precipitation from supersaturated sodium aluminate solutions," Hydrometallurgy, Oct. 2004, vol. 74, No. 3-4, pp. 203-212.

* cited by examiner

TRANSITIONAL ALUMINA PARTICULATE MATERIALS HAVING CONTROLLED MORPHOLOGY AND PROCESSING FOR FORMING SAME

BACKGROUND

1. Field of the Disclosure

The present invention generally relates to transitional alumina particulate material and processes for forming same. More specifically, the present invention relates to transitional alumina particulate material having novel morphological features.

2. Description of the Related Art

Aluminous materials have been used in quite a large and varying scope of industrial applications and technologies, from single crystal applications focusing on optical and optoelectronic applications, to polycrystalline abrasive grains used in free abrasives, bonded abrasives, and coated abrasives, for example. Aluminous materials are generally polymorphic, and may include various hydrated forms such as boehmite and gibbsite. Among the various alumina materials, alumina, or aluminum oxide, is a particular material of interest. In various industrial applications, alumina is employed in its hardest and most stable allotropic state, alpha-alumina. However, the transitional forms of alumina, which include gamma, delta, and theta have gained commercial interest as these phases have desirable properties, such as desirable hardness and surface area characteristics that make transitional alumina of great interest in areas as diverse as printing inks and catalyst carriers.

Currently available transitional aluminas are typically processed by heat treating transitional alumina precursor materials such as gibbsite, boehmite, or bayerite to the desired phase transformation temperature. Other techniques rely on direct synthesis via a wet chemical processing, such as through hydrolysis of aluminum alkoxide. Current techniques often suffer from poor yield, high expense, and/or limited flexibility to form new morphologies that may be of interest in emerging markets based on exploitation of transitional aluminas.

Accordingly, as should be clear, a need exists in the art for transitional aluminas that have novel morphological features. In addition to the interest in creating new materials, processing technology enabling the formation of such materials needs to be developed as well. In this regard, such processing technology is desirably cost effective, is relatively straightforward to control, and provides high yields.

SUMMARY

According to one embodiment, alumina particulate material contains particles comprising transitional alumina having an aspect ratio of not less than 3:1 and an average particle size of not less than about 110 nm and not greater than 1000 nm.

According to another embodiment, alumina particulate material, containing mainly seeded needle-shaped particles comprising transitional alumina having an aspect ratio of not less than 3:1, a secondary aspect ratio of not greater than 3:1, and an average particle size of not less than about 75 nm.

According to another embodiment, alumina particulate material, containing mainly seeded platy-shaped particles comprising transitional alumina having an aspect ratio of not less than 3:1, a secondary aspect ratio of not less than 3:1, and an average particle size of not less than about 125 nm.

According to another embodiment, a method for forming alumina particulate material calls for providing a boehmite precursor and boehmite seeds in a suspension, heat treating the suspension to convert the boehmite precursor into boehmite particulate material; and calcining the boehmite particulate material to transform the boehmite particulate material into transitional alumina particulate material.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

According to an embodiment of the present invention, a powder in the form of a transitional alumina particulate material is formed through a seeded processing pathway. Processing typically involves heat treatment of a transitional alumina precursor into transitional alumina, in form of gamma, delta, or theta alumina, or combinations thereof. The transitional alumina is generally a mass of particulate material, composed of particles that may be fully dispersed, partially agglomerated, or fully agglomerated. In the dry form, the particulate material may be described as a powder. The process typically makes use of boehmite as the transitional alumina precursor, which is processed through the above-noted seeded processing pathway. In more detail, processing includes providing a boehmite precursor and boehmite seeds in a suspension, and heat treating (such as by hydrothermal treatment) the suspension (alternatively sol or slurry) to convert the boehmite precursor into boehmite particulate material formed of particles or crystallites. Heat treatment is then carried out to the boehmite particulate material to effect polymorphic transformation into transitional alumina. According to a particular aspect, the boehmite particulate material has a relatively elongated morphology, described generally herein in terms of aspect ratio and described in more detail below. In addition, the morphological features associated with the boehmite are preserved in the final transitional alumina particulate material.

The term "boehmite" is generally used herein to denote alumina hydrates including mineral boehmite, typically being $Al_2O_3 \cdot H_2O$ and having a water content on the order of 15%, as well as psuedoboehmite, having a water content higher than 15%, such as 20-38% by weight. It is noted that boehmite (including psuedoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

The aspect ratio, defined as the ratio of the longest dimension to the next longest dimension perpendicular to the longest dimension, is generally not less than 2:1, and preferably not less than 3:1, 4:1, or 6:1. Indeed, certain embodiments have relatively elongated particles, such as not less than 8:1, 10:1, and in some cases, not less than 14:1. With particular reference to needle-shaped particles, the particles may be further characterized with reference to a secondary aspect ratio defined as the ratio of the second longest dimension to the third longest dimension. The secondary aspect ratio is generally not greater than 3:1, typically not greater than 2:1, or even 1.5:1, and oftentimes about 1:1. The secondary aspect ratio generally describes the cross-sectional geometry of the particles in a plane perpendicular to the longest dimension. It is noted that since the term aspect ratio is used herein to denote the ratio of the longest dimension to the next longest dimension, it may be referred as the primary aspect ratio.

According to another embodiment, the boehmite can be platey or platelet-shaped particles generally have an elongated structure having the aspect ratios described above in connection with the needle-shaped particles. However, platelet-shaped particles generally have opposite major surfaces, the opposite major surfaces being generally planar and generally parallel to each other. In addition, the platelet-shaped particles may be characterized as having a secondary aspect ratio greater than that of needle-shaped particles, generally not less than about 3:1, such as not less than about 6:1, or even not less than 10:1. Typically, the shortest dimension or edge dimension, perpendicular to the opposite major surfaces or faces, is generally less than 50 nanometers, such as less than about 40 nanometers, or less than about 30 nanometers.

Morphology of the boehmite particulate material may be further defined in terms of particle size, more particularly, average particle size. Here, the seeded boehmite particulate material, that is, boehmite formed through a seeding process (described in more detail below) has a relatively fine particle or crystallite size. Generally, the average particle size is not greater than about 1000 nanometers, and fall within a range of about 100 to 1000 nanometers. Other embodiments have even finer average particle sizes, such as not greater than about 800 nanometers, 750 nanometers, 600 nanometers, 500 nanometers, 400 nanometers, and even particles having an average particle size smaller than 300 nanometers, representing a fine particulate material. In the context of fine particulate material, embodiments were shown to have a particle size smaller than 250 nanometers, such as not greater than 225 nanometers. One range for average particle size lies within a range of 150 to 200 nanometers. Due to process constraints of certain embodiments, the smallest average particle size is generally limited, such as not less than about 75 nanometers, 100 nanometers (particularly in the case of platy particulate material a minimum particle size of 110 nanometers), 125 nanometers, or 135 nanometers.

As used herein, the "average particle size" is used to denote the average longest or length dimension of the particles. Due to the elongated morphology of the particles, conventional characterization technology is generally inadequate to measure average particle size, since characterization technology is generally based upon an assumption that the particles are spherical or near-spherical. Accordingly, average particle size was determined by taking multiple representative samples and physically measuring the particle sizes found in representative samples. Such samples may be taken by various characterization techniques, such as by scanning electron microscopy (SEM). The term average particle size also denotes primary particle size, related to the individually identifiable particles, whether dispersed or agglomerated forms. Of course, agglomerates have a comparatively larger average particle size, and the present disclosure does not focus on agglomerate sizing.

The present seeded boehmite particulate material has been found to have a fine average particle size, while oftentimes competing non-seeded based technologies are generally incapable of providing such fine average particle sizes. In this regard, it is noted that oftentimes in the literature, reported particle sizes are not set forth in the context of averages as in the present specification, but rather, in the context of nominal range of particle sizes derived from physical inspection of samples of the particulate material. Accordingly, the average particle size will lie within the reported range in the prior art, generally at about the arithmetic midpoint of the reported range, for the expected Gaussian particle size distribution. Stated alternatively, while non-seeded based technologies may report fine particle size, such fine sizing generally denotes the lower limit of an observed particle size distribution and not average particle size.

Likewise, in a similar manner, the above-reported aspect ratios generally correspond to the average aspect ratio taken from representative sampling, rather than upper or lower limits associated with the aspect ratios of the particulate material. Oftentimes in the literature, reported particle aspect ratios are not set forth in the context of averages as in the present specification, but rather, in the context of nominal range of aspect ratios derived from physical inspection of samples of the particulate material. Accordingly, the average aspect ratio will lie within the reported range in the prior art, generally at about the arithmetic midpoint of the reported range, for the expected Gaussian particle morphology distribution. Stated alternatively, while non-seeded based technologies may report aspect ratio, such data generally denotes the lower limit of an observed aspect ratio distribution and not average aspect ratio.

In addition to aspect ratio and average particle size of the particulate material, morphology of the particulate material may be further characterized in terms of specific surface area. Here, the commonly available BET technique was utilized to measure specific surface area of the particulate material. According to embodiments herein, the boehmite particulate material has a relatively high specific surface area, generally not less than about 10 $m^2/g$, such as not less than about 50 $m^2/g$, 70 $m^2/g$, or not less than about 90 $m^2/g$. Since specific surface area is a function of particle morphology as well as particle size, generally the specific surface area of embodiments was less than about 400 $m^2/g$, such as less than about 350 or 300 $m^2/g$. Specific ranges for surface area are about 75 $m^2/g$ to 200 $m^2/g$.

Turning to the details of the processes by which the boehmite particulate material (forming a transitional alumina precursor, or feedstock material) may be manufactured, generally ellipsoid, needle, or platelet-shaped boehmite particles are formed from a boehmite precursor, typically an aluminous material including bauxitic minerals, by hydrothermal treatment as generally described in the commonly owned patent described above, U.S. Pat. No. 4,797,139. More specifically, the boehmite particulate material may be formed by combining the boehmite precursor and boehmite seeds in suspension, exposing the suspension (alternatively sol or slurry) to heat treatment to cause conversion of the raw material into boehmite particulate material, further influenced by the boehmite seeds provided in suspension. Heating is generally carried out in an autogenous environment, that is, in an autoclave, such that an elevated pressure is generated during processing. The pH of the suspension is generally selected from a value of less than 7 or greater than 8, and the boehmite seed material has a particle size finer than about 0.5 microns. Generally, the seed particles are present in an amount greater than about 1% by weight of the boehmite precursor (calculated as $Al_2O_3$), and heating is carried out at a temperature greater than about 120° C., such as greater than about 125° C., or even greater than about 130° C., and at a pressure that is autogenously generated, typically around 30 psi.

The particulate material may be fabricated with extended hydrothermal conditions combined with relatively low seeding levels and acidic pH, resulting in preferential growth of boehmite along one axis or two axes. Longer hydrothermal treatment may be used to produce even longer and higher aspect ratio of the boehmite particles and/or larger particles in general.

Following heat treatment, such as by hydrothermal treatment, and boehmite conversion, the liquid content is generally removed, such as through an ultrafiltration process or by heat treatment to evaporate the remaining liquid. Thereafter, the resulting mass is generally crushed, such to 100 mesh. It is noted that the particulate size described herein generally describes the single crystallites formed through processing, rather than the aggregates which may remain in certain embodiments (e.g., for those products that call for and aggregated material).

According to data gathered by the present inventors, several variables may be modified during the processing of the boehmite raw material, to effect the desired morphology. These variables notably include the weight ratio, that is, the ratio of boehmite precursor to boehmite seed, the particular type or species of acid or base used during processing (as well as the relative pH level), and the temperature (which is directly proportional to pressure in an autogenous hydrothermal environment) of the system.

In particular, when the weight ratio is modified while holding the other variables constant, the shape and size of the particles forming the boehmite particulate material are modified. For example, when processing is carried at 180° C. for two hours in a 2 weight % nitric acid solution, a 90:10 ATH: boehmite seed ratio forms needle-shaped particles (ATH being a species of boehmite precursor). In contrast, when the ATH:boehmite seed ratio is reduced to a value of 80:20, the particles become more elliptically shaped. Still further, when the ratio is further reduced to 60:40, the particles become near-spherical. Accordingly, most typically the ratio of boehmite precursor to boehmite seeds is not less than about 60:40, such as not less than about 70:30 or 80:20. However, to ensure adequate seeding levels to promote the fine particulate morphology that is desired, the weight ratio of boehmite precursor to boehmite seeds is generally not greater than about 98:2. Based on the foregoing, an increase in weight ratio generally increases aspect ratio, while a decrease in weight ratio generally decreased aspect ratio.

Further, when the type of acid or base is modified, holding the other variables constant, the shape (e.g., aspect ratio) and size of the particles are affected. For example, when processing is carried out at 180° C. for two hours with an ATH: boehmite seed ratio of 90:10 in a 2 weight % nitric acid solution, the synthesized particles are generally needle-shaped, in contrast, when the acid is substituted with HCl at a content of 1 weight % or less, the synthesized particles are generally near spherical. When 2 weight % or higher of HCl is utilized, the synthesized particles become generally needle-shaped. At 1 weight % formic acid, the synthesized particles are platelet-shaped. Further, with use of a basic solution, such as 1 weight % KOH, the synthesized particles are platelet-shaped. If a mixture of acids and bases is utilized, such as 1 weight % KOH and 0.7 weight % nitric acid, the morphology of the synthesized particles is platelet-shaped. Noteworthy, the above weight % values of the acids and bases are based on the solids content only of the respective solid suspensions or slurries, that is, are not based on the total weight % of the total weight of the slurries.

Suitable acids and bases include mineral acids such as nitric acid, organic acids such as formic acid, halogen acids such as hydrochloric acid, and acidic salts such as aluminum nitrate and magnesium sulfate. Effective bases include, for example, amines including ammonia, alkali hydroxides such as potassium hydroxide, alkaline hydroxides such as calcium hydroxide, and basic salts.

Still further, when temperature is modified while holding other variables constant, typically changes are manifested in particle size. For example, when processing is carried out at an ATH:boehmite seed ratio of 90:10 in a 2 weight % nitric acid solution at 150° C. for two hours, the crystalline size from XRD (x-ray diffraction characterization) was found to be 115 Angstroms. However, at 160° C. the average particle size was found to be 143 Angstroms. Accordingly, as temperature is increased, particle size is also increased, representing a directly proportional relationship between particle size and temperature.

According to embodiments described herein, a relatively powerful and flexible process methodology may be employed to engineer desired morphologies into the precursor boehmite product. Of particular significance, embodiments utilize seeded processing resulting in a cost-effective processing route with a high degree of process control which may result in desired fine average particle sizes as well as controlled particle size distributions. The combination of (i) identifying and controlling key variables in the process methodology, such as weight ratio, acid and base species and temperature, and (ii) seeding-based technology is of particular significance, providing repeatable and controllable processing of desired boehmite particulate material morphologies.

While the foregoing has focused on boehmite production, which forms the feedstock material or transitional alumina precursor material, a particular aspect of the present invention involves further processing of the precursor material into transitional alumina. Here, the boehmite precursor is heat treated by calcination at a temperature sufficient to cause transformation into a transitional phase alumina, or a combination of transitional phases. Typically, calcination or heat treatment is carried out at a temperature greater than about 250° C., but lower than 1100° C. At temperatures less than 250° C., transformation into the lowest temperature form of transitional alumina, gamma alumina, typically will not take place. At temperatures greater than 1100° C., typically the precursor will transform into the alpha phase, which is to be avoided to obtain transitional alumina particulate material. According to certain embodiments, calcination is carried out at a temperature greater than 400° C., such as not less than about 450° C. The maximum calcination temperature may be less than 1050 or 1100° C., these upper temperatures usually resulting in a substantial proportion of theta phase alumina, the highest temperature form of transitional alumina.

Other embodiments are calcined at a temperature lower than 950° C., such as within a range of 750 to 950° C. to form a substantial content of delta alumina. According to particular embodiments, calcination is carried out at a temperature less than about 800° C., such as less than about 775° C. or 750° C. to effect transformation into a predominant gamma phase.

Calcination may be carried out in various environments including controlled gas and pressure environments. Because calcination is generally carried out to effect phase changes in the precursor material and not chemical reaction, and since the resulting material is predominantly an oxide, specialized gaseous and pressure environments need not be implemented except for most desired transitional alumina end products.

However, typically, calcination is carried out for a controlled time period to effect repeatable and reliable transformation from batch to batch. Here, most typically shock calcination is not carried out, as it is difficult to control temperature and hence control phase distribution. Accordingly, calcination times typically range from about 0.5 minutes to 60 minutes typically, 1 minute to 15 minutes.

Generally, as a result of calcination, the particulate material is mainly (more than 50 wt %) transitional alumina. More typically, the transformed particulate material was found to contain at least 70 wt %, typically at least 80 wt %, such as at least 90 wt % transitional alumina. The exact makeup of transitional alumina phases may vary according to different embodiments, such as a blend of transitional phases, or essentially a single phase of a transitional alumina (e.g., at least 95 wt %, 98 wt %, or even up to 100 wt % of a single phase of a transitional alumina).

According to one particular feature, the morphology of the boehmite feedstock material is largely maintained in the final, as-formed transitional alumina. Accordingly, desirable morphological features may be engineered into the boehmite according to the foregoing teaching, and those features preserved. For example embodiments have been shown to retain at least the specific surface area of the feedstock material, and in some cases, increase surface area by amount of at least 8%, 10%, 12%, 14% or more. Since morphology is largely preserved in the final product, the foregoing description in connection with morphological features of the boehmite may be applicable to the transitional alumina particulate material as well.

For example, the aspect ratio of the transitional alumina particulate material is generally not less than 2:1, and preferably not less than 3:1, 4:1, or 6:1. Indeed, certain embodiments have relatively elongated particles, such as not less than 8:1, 10:1, and in some cases, not less than 14:1. With particular reference to needle-shaped particles, the secondary aspect ratio is generally not greater than 3:1, typically not greater than 2:1, or even 1.5:1, and oftentimes about 1:1. The secondary aspect ratio generally describes the cross-sectional geometry of the particles in a plane perpendicular to the longest dimension.

Platey or platelet-shaped transitional alumina particles generally have an elongated structure having the aspect ratios described above in connection with the needle-shaped particles. However, platelet-shaped particles generally have opposite major surfaces, the opposite major surfaces being generally planar and generally parallel to each other. In addition, the platelet-shaped particles may be characterized as having a secondary aspect ratio greater than that of needle-shaped particles, generally not less than about 3:1, such as not less than about 6:1, or even not less than 10:1. Typically, the shortest dimension or edge dimension, perpendicular to the opposite major surfaces or faces, is generally less than 50 nanometers, such as less than about 40 nanometers, or less than about 30 nanometers.

Further, the average particle size of the transitional alumina particulate material is generally not greater than about 1000 nanometers, and fall within a range of about 75 to 750 nanometers. Other embodiments have even finer average particle sizes, such as not greater than about 600 nanometers, 500 nanometers, 400 nanometers, 300 nanometers, and even particles having an average particle size smaller than 275 nanometers, representing a fine particulate material. In the context of fine particulate material, embodiments were shown to have a particle size smaller than 250 nanometers, such as not greater than 225 nanometers. One range for average particle size lies within a range of 150 to 200 nanometers. Due to process constraints of certain embodiments, the smallest average particle size is generally limited, such as not less than about 75 nanometers, 100 nanometers, (particularly in the case of platy particulate material a minimum particle size of 110 nanometers), 125 nanometers, or 135 nanometers.

As above, the term "average particle size" is used to denote the average longest or length dimension of the particles. Due to the elongated morphology of the particles, conventional characterization technology is generally inadequate to measure average particle size, since characterization technology is generally based upon an assumption that the particles are spherical or near-spherical. Accordingly, average particle size was determined by taking multiple representative samples and physically measuring the particle sizes found in representative samples. Such samples may be taken by various characterization techniques, such as by scanning electron microscopy (SEM). It is noted that oftentimes in the literature, reported particle sizes are not set forth in the context of averages as in the present specification, but rather, in the context of nominal range of particle sizes derived from physical inspection of samples of the particulate material. Accordingly, the average particle size will lie within the reported range in the prior art, generally at about the arithmetic mid-point of the reported range, for the expected Gaussian particle size distribution. The term average particle size also denotes primary particle size, related to the individually identifiable particles, whether dispersed or agglomerated forms. Of course, agglomerates have a comparatively larger average particle size, and the present disclosure does not focus on agglomerate sizing.

Likewise, in a similar manner, the above-reported aspect ratios generally correspond to the average aspect ratio taken from representative sampling, rather than upper or lower limits associated with the aspect ratios of the particulate material. Oftentimes in the literature, reported particle aspect ratios are not set forth in the context of averages as in the present specification, but rather, in the context of nominal range of aspect ratios derived from physical inspection of samples of the particulate material. Accordingly, the average aspect ratio will lie within the reported range in the prior art, generally at about the arithmetic midpoint of the reported range, for the expected Gaussian particle morphology distribution. Stated alternatively, while non-seeded based technologies may report aspect ratio, such data generally denotes the lower limit of an observed aspect ratio distribution and not average aspect ratio.

In addition to aspect ratio and average particle size of the particulate material, morphology of the particulate material may be further characterized in terms of specific surface area. Here, the commonly available BET technique was utilized to measure specific surface area of the transitional alumina particulate material. According to embodiments herein, the particulate material has a relatively high specific surface area, generally not less than about 10 $m^2/g$, such as not less than about 50 $m^2/g$, 70 $m^2/g$, or not less than about 90 $m^2/g$. Since specific surface area is a function of particle morphology as well as particle size, generally the specific surface area of embodiments was less than about 400 $m^2/g$, such as less than about 350 or 300 $m^2/g$. Specific ranges for surface area are about 75 $m^2/g$ to 200 $m^2/g$.

Particular significance is attributed to the seeded processing pathway, as not only does seeded processing to form the transitional alumina precursor allow for tightly controlled morphology of the precursor (which is largely preserved in the final product), but also the seeded processing route is believed to manifest desirable physical properties in the final product, including compositional, morphological, and crystalline distinctions over transitional alumina formed by conventional, non-seeded processing pathways, discussed in more detail below.

Example 1

Plate-Shaped Particle Synthesis

An autoclave was charged with 7.42 lb. of Hydral 710 aluminum trihydroxide purchased from Alcoa; 0.82 lb of boehmite obtained from SASOL under the name—Catapal B pseudoboehmite; 66.5 lb of deionized water; 0.037 lb potassium hydroxide; and 0.18 lb of 22 wt % nitric acid. The boehmite was pre-dispersed in 5 lb of the water and 0.18 lb of the acid before adding to the aluminum trihydroxide and the remaining water and potassium hydroxide.

The autoclave was heated to 185° C. over a 45 minute period and maintained at that temperature for 2 hours with stirring at 530 rpm. An autogenously generated pressure of about 163 psi was reached and maintained. Thereafter the boehmite dispersion was removed from the autoclave. After autoclave the pH of the sol was about 10. The liquid content was removed at a temperature of 65° C. The resultant mass was crushed to less than 100 mesh. The SSA of the resultant powder was about 62 $m^2/g$.

Figure 1:
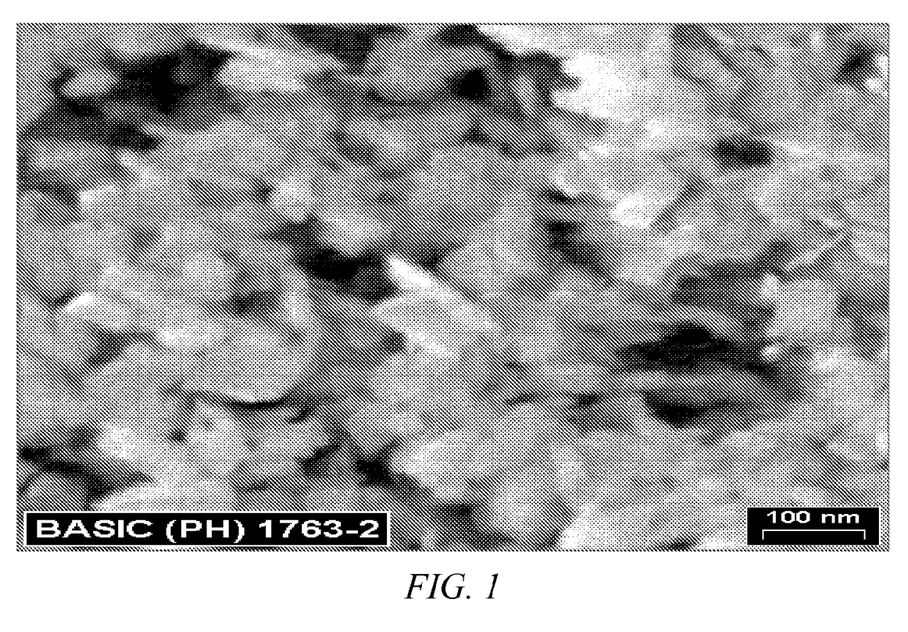
FIG. 1 is an SEM micrograph showing platelet shaped transitional alumina.

This material was calcined at 530° C. for 5 minutes to transform into gamma alumina. After calcination, the material was confirmed to be 100% gamma alumina due to X-Ray diffraction Rietveld analysis. The specific surface area of the sample was 100.7 $m^2/g$. See FIG. 1.

Example 2

Needle-Shaped Particle Synthesis

An autoclave was charged with 250 g of Hydral 710 aluminum trihydroxide purchased from Alcoa; 25 g of boehmite obtained from SASOL under the name—Catapal B pseudoboehmite; 1000 g of deionized water; and 34.7 g of 18% nitric acid. The boehmite was pre-dispersed in 100 g of the water and 6.9 g of the acid before adding to the aluminum trihydroxide and the remaining water and acid.

The autoclave was heated to 180° C. over a 45 minute period and maintained at that temperature for 2 hours with stirring at 530 rpm. An autogenously generated pressure of about 150 psi was reached and maintained. Thereafter the boehmite dispersion was removed from the autoclave. After autoclave the pH of the sol was about 3. The liquid content was removed at a temperature of 95° C. The resultant mass was crushed to less than 100 mesh. The SSA of the resultant powder was about 120 $m^2/g$.

Figure 2:
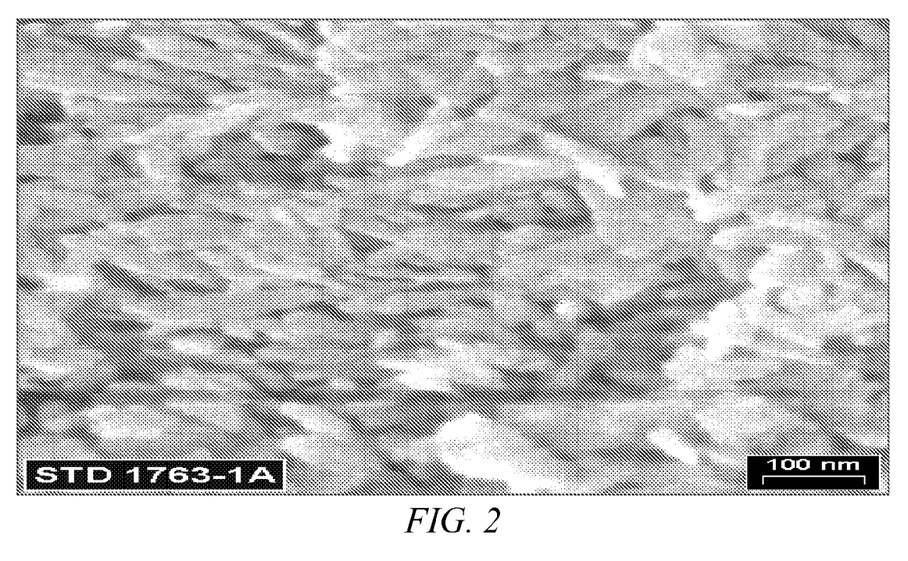
FIG. 2 is an SEM micrograph showing needle shaped transitional alumina.

This material was calcined at 530° C. for 5 min to transform into gamma alumina. After calcination, it was confirmed to be 100% gamma alumina due to X-Ray diffraction Rietveld analysis. The specific surface area of the sample was 145.1 $m^2/g$. See FIG. 2.

Example 3

Ellipsoid Shaped Particle Synthesis

An autoclave was charged with 220 g of Hydral 710 aluminum trihydroxide purchased from Alcoa; 55 g of boehmite obtained from SASOL under the name—Catapal B pseudoboehmite; 1000 g of deionized water; and 21.4 g of 18% nitric acid. The boehmite was pre-dispersed in 100 g of the water and 15.3 g of the acid before adding to the aluminum trihydroxide and the remaining water and acid.

The autoclave was heated to 172° C. over a 45 minute period and maintained at that temperature for 3 hours with stirring at 530 rpm. An autogenously generated pressure of about 120 psi was reached and maintained. Thereafter the boehmite dispersion was removed from the autoclave. After autoclave the pH of the sol was about 4. The liquid content was removed at a temperature of 95° C. The resultant mass was crushed to less than 100 mesh. The SSA of the resultant powder was about 135 $m^2/g$.

Figure 3:
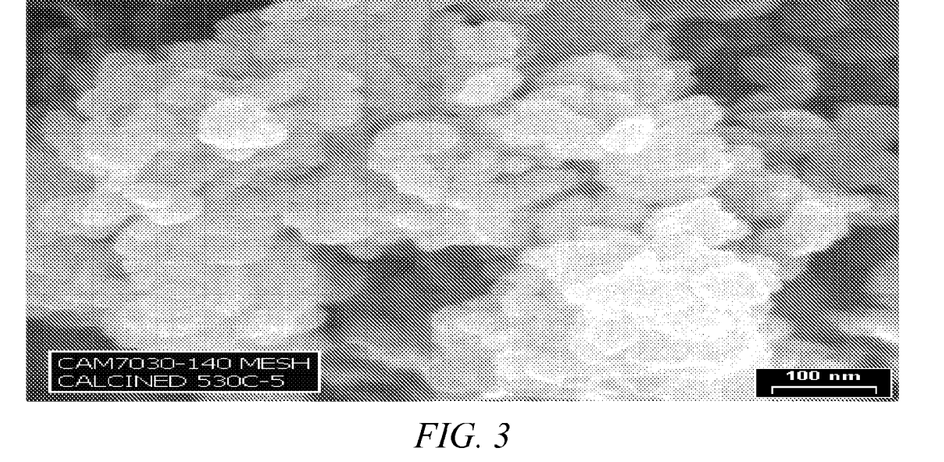
FIG. 3 is an SEM micrograph showing ellipsoid shaped transitional alumina.

This material was calcined at 530° C. for 5 minutes to transform into gamma alumina. After calcination, it was confirmed to be 100% gamma alumina due to X-Ray diffraction Rietveld analysis. The specific surface area of the sample 167.8 $m^2/g$. See FIG. 3.

Figure 4:
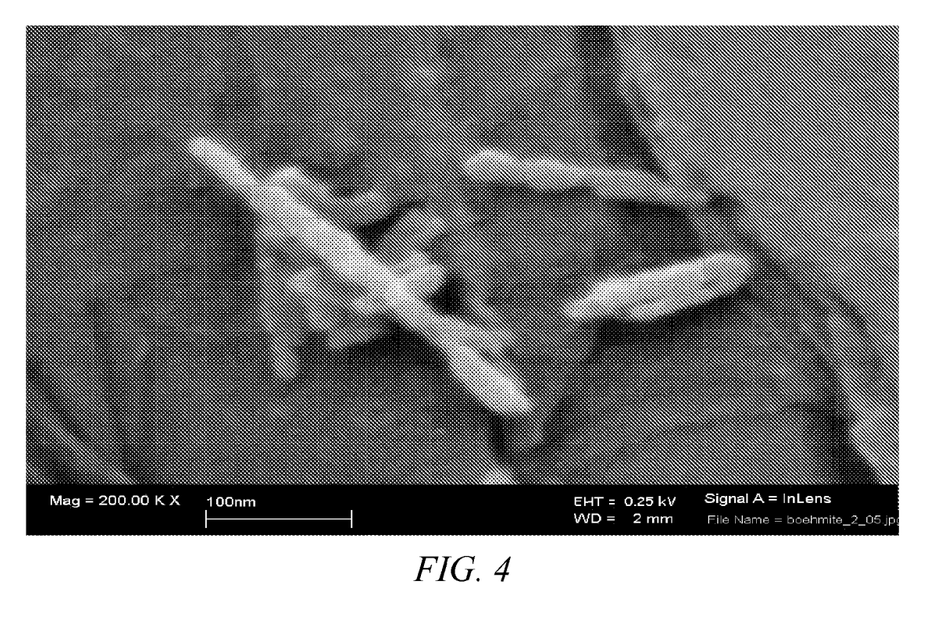
FIG. 4. is an SEM showing needle shaped boehmite.
Figure 5:
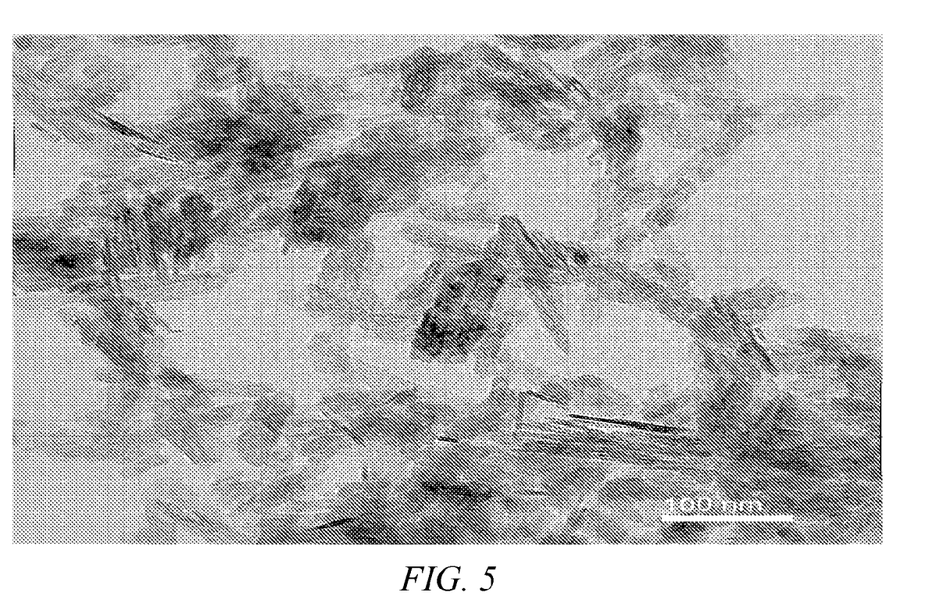
FIG. 5 is a TEM of the material shown in FIG. 4.

Additional characterization studies were carried out to more precisely understand the effect of seeding on particle morphology. FIG. 4 illustrates needle shaped particles as discussed above and in connection with FIG. 2. It is noted that the particle here are in boehmite form, but that the structure shown is retained in the final transition alumina product. FIG. 4 more clearly reveals that the seeded particles have a nodular structure, in that the particles are 'bumpy' or 'knotty' and have a generally rough outer texture. Further characterization was carried out by TEM analysis to discover that what appears by SEM to be generally monolithic particles, the particles are actually formed of tight, dense assemblies of platelet particles as shown in FIG. 5. The particles have a controlled aggregate morphology, in that the aggregates display a level of uniformity beyond conventional aggregate technologies. It is understood that the controlled aggregate structures form the nodular structure more clearly shown in FIG. 4, and are unique to the seeded approach discussed above.

Figure 6:
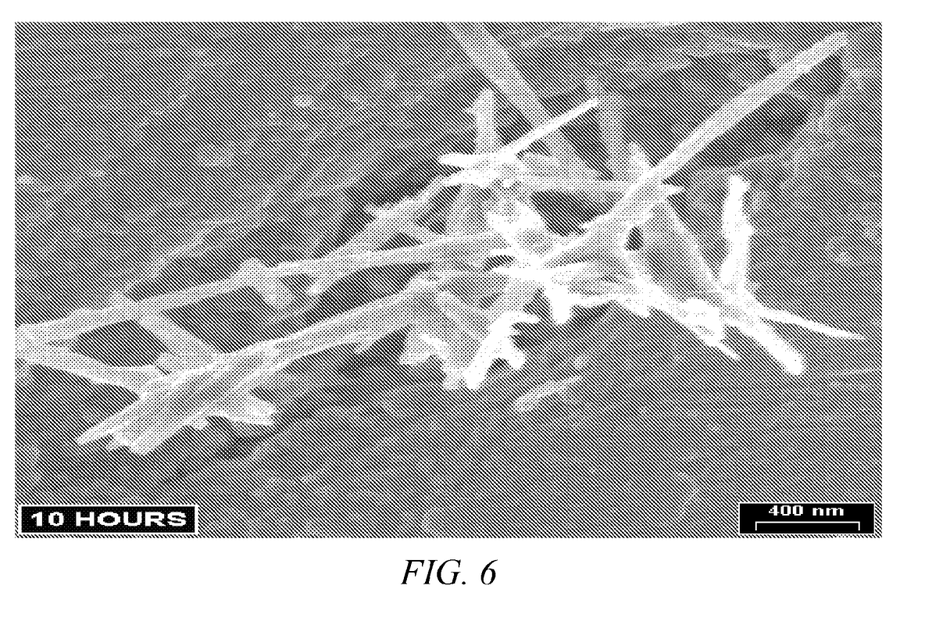
FIG. 6. is an SEM of a comparative boehmite.

It is recognized that non-seeded approaches have been found to form particulate material, including approaches that decompose raw materials through consumption of an aluminum salt, such as aluminum nitrate or aluminum sulfate. However, these metal salt decomposition approaches form morphologically distinct particulates, that are devoid of the seeded morphology, notably lacking the nodular structure. FIG. 6 is representative of such materials, showing non-seeded morphology that has a smooth or hair-like outer surface texture. Examples of such non-seeded approaches include those disclosed in U.S. Pat. No. 3,108,888 and thesis paper Preparation and Characterization of Acicular Particles and Thin Films of Aluminum Oxide, by Raymond M. Brusasco, May 1987. The material shown in FIG. 6 was formed the process disclosed in JP2003-054941.

Aspects of the present invention enable utilization of the boehmite particulate material in a wide variety of applications, including applications that are not particularly well suited for boehmite, such as in applications requiring higher hardness and/or involve high temperature processing, such as melt processing of fluorinated polymers. Properties of flame retardance, UV protection, weatherability, chemical resistance, thermal conductivity, and electrical resistance make the present transitional alumina a significant industrial material. Other uses include implementation as an additive to paper, as an ink absorbent in inkjet printing, as a catalyst, as a filtration media, or as an abrasive in demanding chemical mechanical polishing used in the electronics industry. Notably, the seeded morphology, having the above-disclosed nodular structure, is understood to have particular properties in the context as a filler in a matrix material, such that the particles have improved adhesion within the matrix due to the seeded nature of the particles.

While the invention has been illustrated and described in the context of specific embodiments, it is not intended to be limited to the details shown, since various modifications and substitutions can be made without departing in any way from the scope of the present invention. For example, additional or equivalent substitutes can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A method for forming alumina particulate material, comprising:
   providing a boehmite precursor and boehmite seeds in a suspension;
   heat treating the suspension to convert the boehmite precursor into boehmite particulate material; and
   calcining the boehmite particulate material at a temperature ranging from about 250° C. to about 1000° C. to transform the boehmite particulate material into transitional alumina particulate material selected from the group consisting of gamma alumina, delta alumina, theta alumina, and combinations thereof, the transitional alumina particulate material having a primary aspect ratio of not less than 3:1.

2. The method of claim 1, wherein heat treating the suspension is carried out at a temperature greater than about 120° C. and a pH greater than 8 to produce platelet shaped boehmite particulate material.

3. The method of claim 1, wherein a weight ratio of boehmite precursor to boehmite seeds is not less than 60:40.

4. The method of claim 1, wherein the average particle size of the transitional alumina particulate material is not less than 75 nm.

5. The method of claim 1, wherein the average particle size is not greater than about 225 nm.

6. The method of claim 1, wherein the transitional alumina particulate has specific surface area greater than that of the boehmite particulate material.

7. A method for forming alumina particulate material, comprising:
   calcining at a temperature ranging from about 250° C. to about 1000° C. a boehmite particulate material having a needle-shape or platelet shape to transform the boehmite particulate material into transitional alumina particulate material selected from one of the group consisting of gamma alumina, delta alumina, theta alumina, and combinations thereof, the transitional alumina particulate material having a primary aspect ratio of not less than 3:1.

8. The method of claim 1, wherein heat treating the suspension is carried out at a temperature greater than about 120° C. and a pH less than 7 to produce needle-shaped shaped boehmite particulate material.

9. The method of claim 1, wherein heat treating the suspension is carried out at a temperature greater than about 120° C. and a pH greater than 8 to produce platelet-shaped shaped boehmite particulate material.

10. The method of claim 1, wherein calcining the boehmite particulate material occurs at a temperature ranging from about 250° C. to about 750° C. to transform the boehmite particulate material into gamma transitional alumina particulate material.

11. The method of claim 1, wherein calcining the boehmite particulate material occurs at a temperature ranging from about 750° C. to about 950° C. to transform the boehmite particulate material into delta transitional alumina particulate material.

12. The method of claim 1, wherein calcining the boehmite particulate material occurs at a temperature ranging from about 950° C. to about 1000° C. to transform the boehmite particulate material into theta transitional alumina particulate material.

13. The method of claim 1, wherein the boehmite particulate material to be calcined has a primary aspect ratio of not less than 3:1.

14. The method of claim 1, wherein the transitional alumina particulate material has a secondary aspect ratio of not greater than 3:1.

15. The method of claim 1, wherein the transitional alumina particulate material has a secondary aspect ratio of not less than 3:1.

16. The method of claim 1, wherein the transitional alumina particulate material is platelet-shaped.

17. The method of claim 1, wherein the transitional alumina particulate material is needle-shaped.

* * * * *